United States Patent [19]

Ryden

[11] Patent Number: 5,322,130
[45] Date of Patent: Jun. 21, 1994

[54] GOLF BALL MARK REPAIR TOOL

[76] Inventor: Al Ryden, 11911 Glenmore Dr., Coral Springs, Fla. 33071

[21] Appl. No.: 974,205

[22] Filed: Nov. 10, 1992

[51] Int. Cl.[5] .............................................. A01B 1/00
[52] U.S. Cl. ..................... 172/378; 294/50.7; 172/371
[58] Field of Search ............. 172/371, 378, 21; 273/32 B, 162 R; 294/50.6–50.8

[56] References Cited

U.S. PATENT DOCUMENTS

| | | | |
|---|---|---|---|
| 531,449 | 12/1894 | Smith | 294/50.7 |
| 1,025,360 | 5/1912 | Auter | 294/50.7 |
| 1,225,188 | 5/1917 | Smith | 294/50.7 |
| 1,328,063 | 1/1920 | St. John | 294/50.7 |
| 1,466,168 | 8/1923 | Holton | 294/50.7 |
| 1,862,777 | 6/1932 | Viita | 294/50.7 |
| 1,885,377 | 11/1932 | Robinson | 294/50.7 |
| 3,168,150 | 2/1965 | Kappler | 172/371 |
| 3,567,264 | 3/1971 | Baber | 172/371 |
| 5,154,465 | 10/1992 | Pakosh | 294/50.8 |

OTHER PUBLICATIONS

1992 Standard Golf Pro–Line Catalog of Golf Course Accessories, p. 30.

Primary Examiner—Randolph A. Reese
Assistant Examiner—Spencer Warnick
Attorney, Agent, or Firm—Harness, Dickey & Pierce

[57] ABSTRACT

A ball repair tool has a plurality of fingers which extend first vertically into the surface of the green. After extending into the green vertically a specified distance, the plurality of fingers are forced conically inward to force both dirt and grass into the unrepaired ball mark. Once repaired, the fingers are retracted leaving a repaired ball mark. The holes made by the blades of the fingers aid in the repair of the ball mark by aerating the area around the repaired ball mark. The vertical extension of the fingers into the green before the conical motion to force dirt and grass into the ball mark provides sufficient depth of the repair area to adequately support the green area.

16 Claims, 3 Drawing Sheets

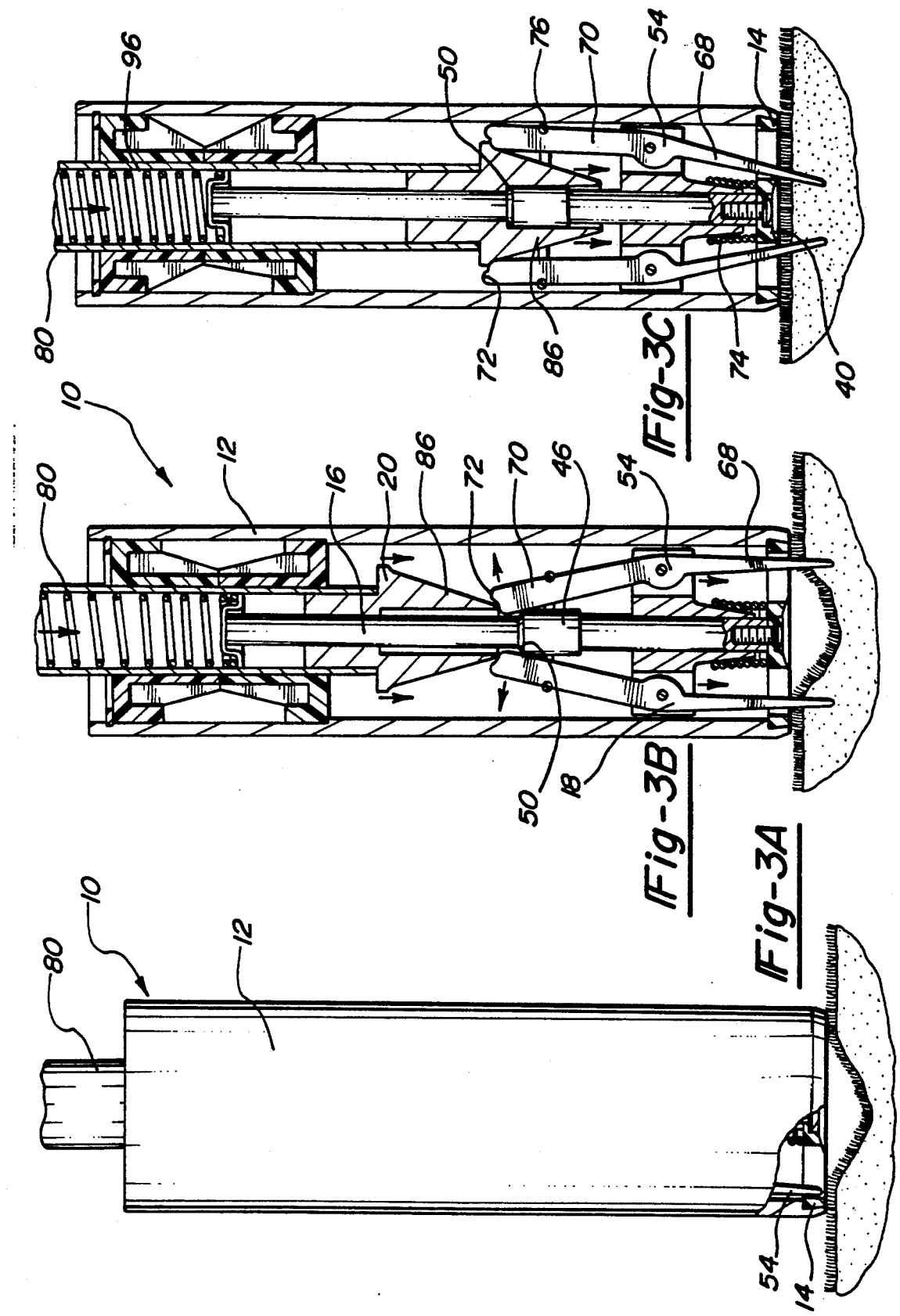

GOLF BALL MARK REPAIR TOOL

FIELD OF THE INVENTION

The present invention relates to a golf green repair tool. More particularly, the present invention relates to a tool for unrepaired golf ball marks on a green which lifts dirt and grass into place to repair the ball mark.

BACKGROUND OF THE INVENTION

Golf ball marks are a continuous problem for greenskeepers. Unrepaired ball marks detract from the appearance of the greens as well as significantly shortening their lives. When a golf ball lands on the surface of a green, especially from a high trajectory, the momentum of the golf ball puts a dent or ball mark in the green. The area of the ball mark at the bottom of the mark is more compressed than the area near the top of the ball mark. The ball mark must be repaired in order to maintain the smooth contour of the green, to maintain appearance of the green in particular and the golf course in general, and to extend the life of the green.

A majority of golfers will attempt to repair their own ball marks while playing their round of golf. The individual golfer uses a wide variety of ball mark repair tools which range from the pointed end of a golf tee to the specially made green repair tools designed to be carried in the golfer's pocket. While these efforts to repair ball marks go a long way towards improving the problems associated with unrepaired ball marks, not every golfer fixes his or her ball marks. Even though a majority of golfers do repair their own ball marks, not every golfer does an adequate and complete job of repairing ball marks.

The greenskeeper is provided with a number of ball mark repair tools to repair the unrepaired ball marks as well as the ball marks partially repaired by the individual golfers. These prior art devices have a plurality of fingers which penetrate the surface of the green and lift the dirt and grass back into place. These prior art repair tools are normally provided with a vertically extending handle which activates the plurality of fingers through various linkage systems pushing them into the ground. The vertically extending handle enables the greenskeeper to repair ball marks without bending over or crawling around on the green.

The problem associated with the prior art ball mark repair tools is that the linkage systems are designed such that a single action of the tool forces the plurality of fingers into the ground in an angular or conical manner around the ball mark. Thus, when these prior art circular tools are placed around a ball mark, the plurality of fingers extend into the ground in a generally conical manner with the ball mark. Thus, when these prior art circular tools are placed around a ball mark, the plurality of fingers extend into the ground in a generally conical manner with the ball mark being located on the base of the formed cone. This single action of the tool which produces an angular or conical motion of the fingers does not provide an adequate depth to reach the bottom of the ball mark where the highest compression of soil is located. Rather than extending the fingers into the ground in a cylindrical manner to provide adequate depth and then changing the fingers to a conical shape, the prior art tools attempt to repair the ball marks by using only the upper material or surface of the green without providing any significant depth to the repair area. This shallow repair technique does not get sufficiently below the bottom or highest compressed area of the ball mark and thus does not adequately repair the greens day after day.

Accordingly, what is needed is a ball mark repair tool which extends deeply into the green prior to lifting the dirt and grass back into place. The deeper penetration of the ball repair area will provide a much more stable repaired area.

SUMMARY OF THE INVENTION

The present invention provides the art with a green repair tool which operates with a dual action. The first action extends a plurality of fingers disposed in a circular manner into the green to form a cylindrical repair area. After penetrating the green a specified distance, the second action moves the plurality of fingers in a conical manner to work under the bottom of the ball mark and force the dirt and grass back into place repairing the ball mark. Another advantage to the present invention is that the deep penetration of the plurality of fingers acts to aerate the green. This deep penetration allows water and nutrients to get to the roots of the grass of the green in the repaired area and thus speeds the growth recovery of the grass in the repaired area.

Other advantages and objects of the present invention will become apparent to those skilled in the art from the subsequent detailed description, appended claims and drawings.

BRIEF DESCRIPTION OF THE DRAWINGS

FIG. 3A is a side view partially in cross section of the repair tool of FIG. 1 positioned over an unrepaired ball mark.

FIG. 3B is a side view partially in cross section of the repair tool of FIG. 1 positioned over an unrepaired ball mark with the plurality of fingers extended into the green to form a cylindrical repair area.

FIG. 3C is a side view partially in cross section of the repair tool of FIG. 1 with the plurality of fingers cammed inward to form a conical shape.

DESCRIPTION OF THE PREFERRED EMBODIMENT

Figure 1:
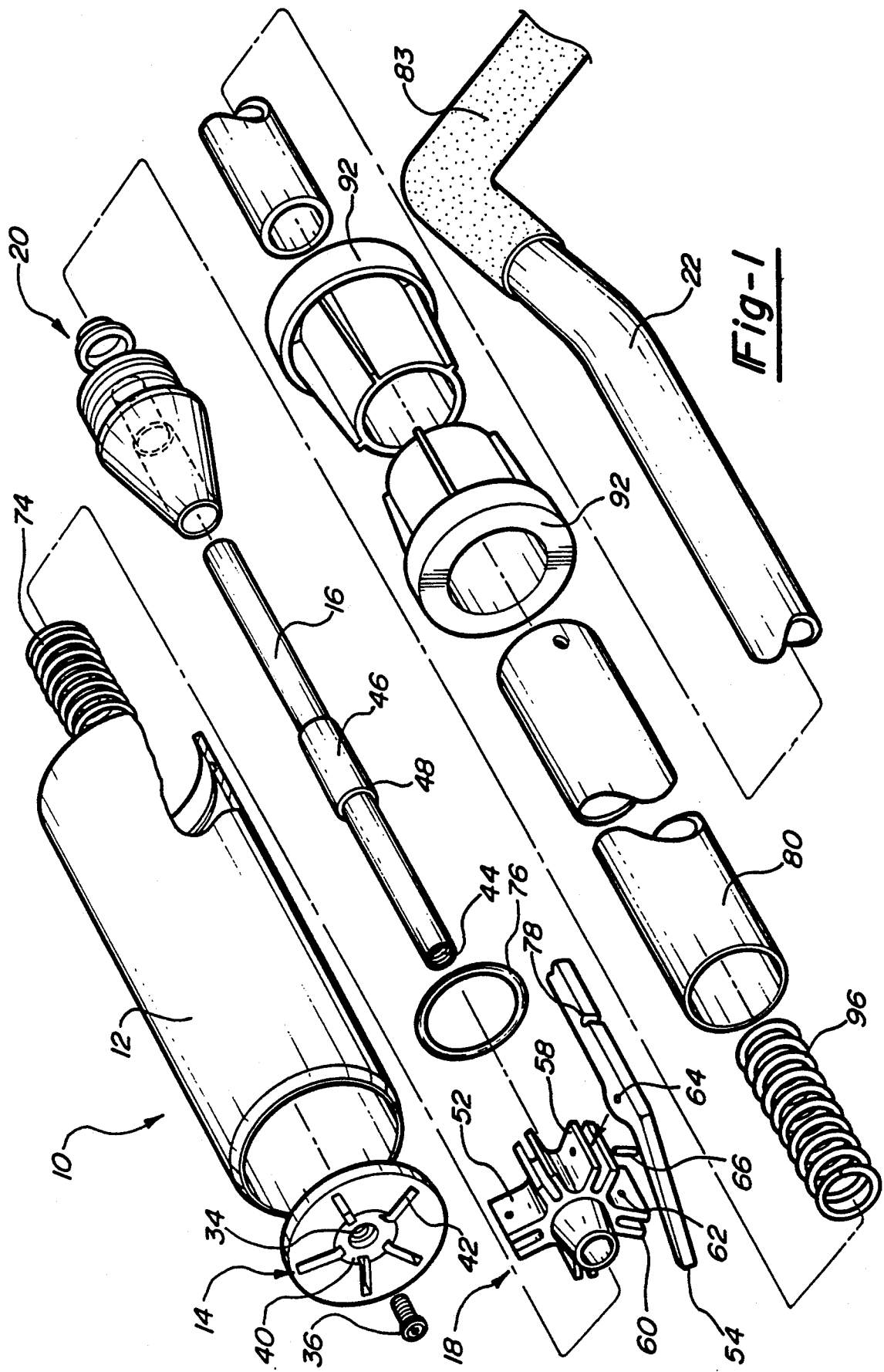
FIG. 1 is an exploded perspective view of a green repair tool according to the present invention.
Figure 2:
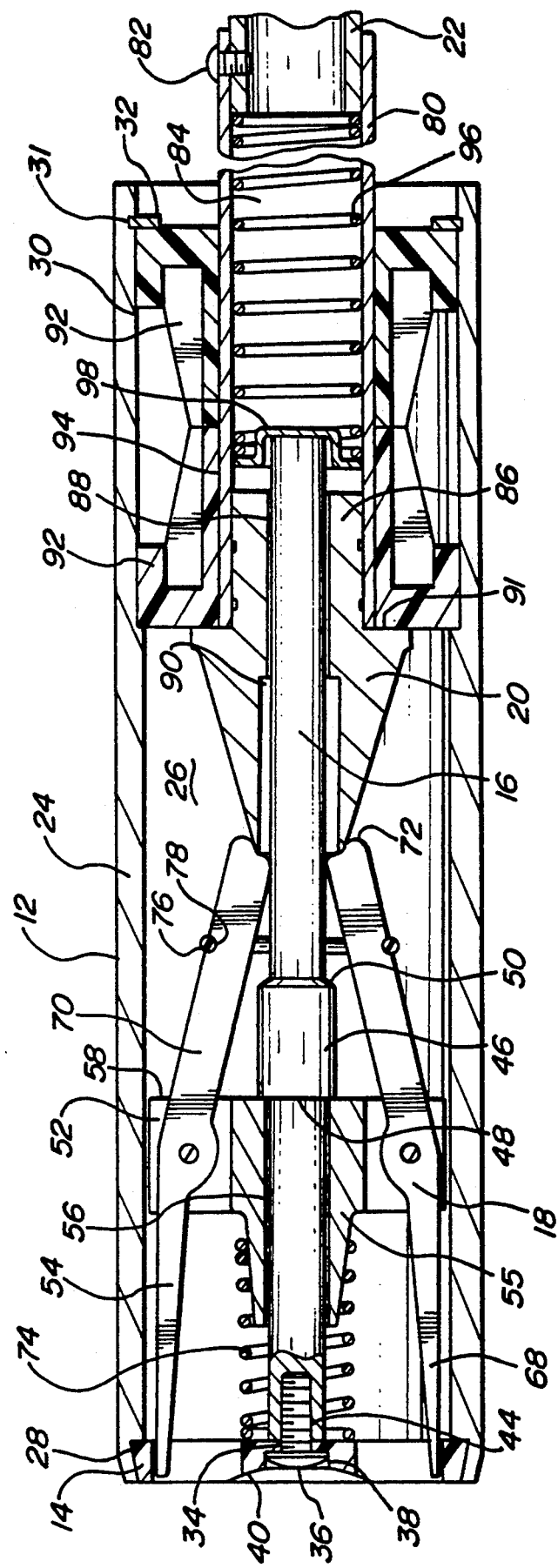
FIG. 2 is a longitudinal cross section of the finger activation system of the green repair tool shown in FIG. 1.

Referring now to the drawings in which like reference numerals designate like or corresponding parts through the several views, there is shown in FIGS. 1 and 2 a ball mark repair tool 10 in accordance with the present invention. Repair tool 10 comprises a housing 12, an end cap 14, a central shaft 16, a finger assembly 18, a ram 20, and a handle 22.

Housing 12 is a tubular housing having a wall 24 defining an internal chamber 26. One end of housing 12 has an annular groove 28 extending into wall 24 for mounting end cap 14. The opposite end of housing 12 has an annular groove 30 extending into wall 24 for locating a pair of annular spacers 92 and an annular groove 31 also extending into wall 24 for locating a retaining ring 32 for holding the internal components of repair tool 10 within chamber 26.

End cap 14 is a disk shaped member disposed within annular groove 28 of housing 12. End cap 14 has a tapered outer surface as shown in FIG. 2 to facilitate attachment to housing 12. End cap 14 is positioned within annular groove 28 and annular groove 28 is rolled over into the tapered portion of end cap 14 to secure end cap 14 to housing 12. End cap 14 can also be secured to housing 12 by welding, adhesives, press fitting or any other means known well in the art. A centrally disposed aperture 34 extends through end cap 14 for securing central shaft 16 to end cap 14 by threaded bolt 36. A counter bore 38 is provided for countersinking the head of bolt 36. A centrally located partially spherical surface 40 is provided in the surface of end cap 14 opposite to internal chamber 26. Spherical surface 40 is provided to allow a space for the repaired ball mark to form a slight mound when being repaired. The mound, once formed can be easily leveled by using a flat tool or the like. A plurality of circumferentially spaced radially extending slots 42 extend through end cap 14. Slots 42 provide the necessary access for the fingers 54 of tool 10 to penetrate the green.

Central shaft 16 has an internal threaded bore 44 for securing central shaft 16 to end cap 14 using bolt 36. Central shaft 16 extends axially within chamber 26 and is generally coaxial with wall 24. Central shaft 16 has an enlarged section 46 having a stop face 48 disposed at the end of section 46 positioned towards end cap 14 and a cam face 50 disposed at the opposite end.

Finger assembly 18 comprises an inner member 52 and a plurality (five in the preferred embodiment) of fingers 54. Inner member 52 has a central hub 55 having a through bore 56 extending completely through hub 55. Extending radially from central hub 55 is a plurality of circumferentially spaced mounting forks 58. Each finger 54 is mounted between a pair of tines 60 of a respective mounting fork 58. Both the tines 60 and the fingers 54 are provided with through apertures 62 and 64 respectively for mounting fingers 54 to tines 60. A retaining pin 66 extends through each of the aligned apertures 62 and 64 to mount fingers 54. Apertures 62 in tines 60 are sized to provide a press fit for pin 66 and thus fixably secure pin 66. Aperture 64 in finger 54 is sized to provide a slip fit with pin 66. Thus, each finger 54 is allowed to rock on pin 66 relative to inner member 50. Each finger 54 has a blade 68 extending from inner member 52 through a respective slot 42 in end cap 14. During operation of the tool, blade 68 is pushed into the green to repair the ball mark. Each finger 54 has an upper section 70 which extends in a direction generally opposite to that of blade section 68 and forms a contoured surface 72 at its end.

Finger assembly 18 is positioned on central shaft 16 between enlarged section 46 and end cap 14. Central shaft 16 extends through bore 56 in central hub 55. Through bore 56 is sized to be a slip fit on central shaft 16. A coil spring 74 biases finger assembly 18 away from end cap 14 and locates finger assembly 18 against stop face 48 on enlarged section 46 of central shaft 16. Sections 70 of fingers 54 extend above enlarged section 46 of central shaft 16. An elastomeric O-ring 76 is located in a groove 78 located in each finger 54 and is sized to bias the plurality of fingers 54 inwardly such that a portion of contoured surface 72 of each finger 54 rests against central shaft 16 at a position above enlarged section 46. In this position, blade 68 is positioned generally parallel to housing 12 and is disposed within chamber 26. The tip of each blade 68 extends into but not through a respective slot 42 in end cap 14.

Ram 20 has a tubular section 80 adapted to connect handle 22 using threaded bolt 82. Handle 22 extends from ram 20 a specified distance to provide a convenient access to repair tool 10 such that it is not necessary to bend over or crawl around the green when repairing ball marks. Handle 22 may be bent to provide a convenient hand piece 83 as shown in FIG. 1. Tubular section 80 has an internal chamber 84 and section 80 extends from handle 22 to a conical shaped end piece 86. End piece 86 has a central bore 88 and is positioned on central shaft 16 such that the smaller portion of the conical section of end piece 86 is in contact with the contoured surfaces 72 on the end of sections 70 of fingers 54. A counterbore 90 may be provided in end piece 86 to have a line contact between end piece 86 and finger 54 as shown in FIG. 2 if desired. Central bore 88 is sized to be a slip fit on central shaft 16. The large end of the conical section of end piece 86 has an abutment face 91. A pair of annular spacers 92 each have an internal bore 94 which is sized for a slip fit over tubular section 80. The outside diameter of annular spacers 92 are sized to have a slip fit relationship with annular groove 30 of housing 12. The length of annular groove 30 is sufficient to locate both annular spacers 92 and retaining ring 32. Annular spacers 92 are positioned within chamber 26 of housing 12 within annular groove 30 between abutment face 91 of end piece 86 and retaining ring 32 located in annular groove 31. A coil spring 96 is disposed within chamber 84 and reacts between handle 22 and central shaft 16 through a washer 98. Coil spring 96 urges ram 20 to the right as shown in FIG. 2 such that abutment face 91 is urged against the pair of annular spacers 92 which are in turn urged against retaining ring 32.

The operation of repair tool 10 begins with the internal components positioned as shown in FIG. 2. Coil spring 74 biases finger assembly 18 away from end cap 14 and against stop face 48. Coil spring 96 biases ram 20 against annular spacers 92 which in turn are biased against retaining ring 32. The operation of the device is illustrated in FIGS. 3A through 3D.

Repair tool 10 is positioned vertically over an unrepaired ball mark as shown in FIG. 3A. As described above, the internal components are positioned as shown in FIG. 2. A vertical force is then exerted on handle 22 forcing ram 20 against upper section 70 of the plurality of fingers 54. Blades 68 of fingers 54 are forced into the green's surface by virtue of the force applied against ram 20 which, in turn, forces fingers 54 downward by virtue of the contact between the small portion of end piece 86 with the contoured surface 72 on upper section 70 of fingers 54. Fingers 54 continue vertically downward with blades 68 being substantially parallel to housing 12 and ram 20 slides downward on central shaft 16. The vertical movement continues until the contoured surface 72 on upper section 70 contacts cam face 50 on enlarged section 46 of central shaft 16. This is the position shown in FIG. 3B.

Cam face 50 forces the upper section 70 of the plurality of fingers 54 outward against the force exerted by O-ring 76. This camming of fingers 54 forces contoured surfaces 72 onto the conical section of end piece 86. At this point, blades 68 of fingers 54 are no longer forced in a vertical direction but are now forced conically inward due to the action of contoured surface 72 against the conical section of end piece 86. This inward conical motion forces dirt and grass upward eliminating the ball mark. This position is shown in FIG. 3C. The dirt and grass are forced upward towards partial spherical surface 40 of end cap 14. This dual action of the fingers of first moving vertically into the green's surface and then camming into a generally conical shape provides a significantly deeper penetration than prior art ball mark repair tools. This deeper penetration provides a much more stable repaired area as the fingers will extend below the bottom or highest compressed area of the ball mark to repair the ball mark.

An upward vertical force is then applied to handle 22 to retract the plurality of fingers 54 and return them to their initial position as shown in FIG. 2. Retraction of the plurality of fingers 54 and the ram 20 to their initial position is aided by coil springs 74 and 96 which are preloaded by the downward movement of handle 22.

When the ball repair tool is removed from the repaired ball mark, any mound formed by the movement of dirt or grass against spherical surface 40 can be easily leveled by using a flat tool, the greenskeeper's foot or the like.

While the above detailed description describes the preferred embodiment of the present invention, it should be understood that the present invention is susceptible to modification, variation and alteration without deviating from the scope and fair meaning of the subjoined claims.

What is claimed is:

1. A repair tool for a ball mark on a green comprising:
   a housing having a first end and a second end one end having a stationary end cap and said housing defining an internal cylindrical cavity and an axis;
   finger means for fixing said ball mark on said green, said finger means positioned within and adjacent said first end and end cap of said housing;
   means for activating said finger means, said activating means positioned in said housing between said finger means and said second end of said housing, said activating means operable to react to an externally applied force to extend said finger means out of said housing along a path generally parallel to said axis of said housing;
   means for camming said finger means inward towards said axis to form a generally conical shape such that said ball mark is repaired, said camming means coupled with said activating means and positioned within said housing.

2. The repair tool of claim 1 wherein said housing comprises:
   a hollow cylindrical tube; and
   said finger means extending through at least one aperture in said end cap.

3. The repair tool of claim 1 further comprising a central shaft extending from said first end of said housing through said internal cylindrical cavity, said central shaft disposed along said axis of said housing, said finger means being disposed between said central shaft and said housing, said central shaft having an abutment face facing said first end of said housing and a cam surface facing said second end of said housing.

4. The repair tool of claim 3 wherein said finger means comprises an inner member slidingly engaged with said central shaft and disposed between said first end of said housing and said abutment face on said central shaft.

5. The repair tool of claim 4 further comprising biasing means for urging said inner member away from said first end of said housing towards said abutment face on said central shaft.

6. The repair tool of claim 4 wherein said finger means further comprises a plurality of fingers each having:
   a central section for rotatably mounting said finger on said inner member;
   a blade section extending from said central section towards said first end of said housing and being generally parallel to said housing;
   an upper section extending from said central section towards said second end of said housing, said upper section being angled inwardly towards said axis and having a contoured end surface.

7. The repair tool of claim 6 wherein said activating means is slidingly engaged with said central shaft, said activating means disposed between said cam surface of said central shaft and said second end of said housing, said activating means engaging said contoured surface of said upper section of said fingers.

8. The repair tool of claim 7 wherein said camming means is a conical surface on the exterior of said activating means.

9. The repair tool of claim 6 having biasing means for urging said upper section of said fingers into engagement with said central shaft.

10. The repair tool of claim 3 wherein said activating means is slidingly engaged with said central shaft between said finger means and said second end of said housing such that axial movement of said activating means on said shaft causes said finger means to move along said path generally parallel to said housing.

11. The repair tool of claim 10 wherein said camming means is a conical surface on the exterior of said activating means such that said finger means are forced onto said conical surface by contact with said cam surface on said central shaft during axial movement of said activating means, said conical surface forcing said finger means to form said conical shape by continued axial movement of said activating means.

12. The repair tool of claim 1 further comprising a handle fixedly secured to said activating means and extending outward from said housing.

13. The repair tool of claim 1 further comprising biasing means for urging said activating means towards said second end of said housing.

14. The repair tool of claim 1 further comprising at least one annular insert between said activating means and said housing.

15. The repair tool of claim 1 further comprising means for retaining said finger means, said activating means and said camming means within said internal cylindrical cavity.

16. The repair tool of claim 1 wherein said activating means comprises a ram having an end piece and a hollow tubular member attached to said end piece, said camming means being located on said end piece.

* * * * *

UNITED STATES PATENT AND TRADEMARK OFFICE
CERTIFICATE OF CORRECTION

PATENT NO.   :   5,322,130
DATED        :   June 21, 1994
INVENTOR(S)  :   Al Ryden It is certified that error appears in the above-indentified patent and that said Letters Patent is hereby corrected as shown below:

Column 1, lines 54 through 57, after "mark", please delete ". Thus, when these prior art circular tools are placed around a ball mark, the plurality of fingers extend into the ground in a generally conical manner with the ball mark"

Signed and Sealed this

Twenty-ninth Day of August, 1995

Attest:

BRUCE LEHMAN

*Attesting Officer*      *Commissioner of Patents and Trademarks*